United States Patent
Abadia et al.

[19]

[11] Patent Number: 5,892,308
[45] Date of Patent: Apr. 6, 1999

[54] RECTIFIER ASSEMBLY OF A MOTOR VEHICLE ALTERNATOR WITH A THERMAL DISSIPATOR

[75] Inventors: Roger Abadia, Neuilly-Plaisance; Jean-Marc Dubus, Bonneuil sur Marne; Jean Gautier, Saint Barthelemy D'Anjou; Daniel Richard, Marolles en Brie; Georges Tranchon, Cretell, all of France

[73] Assignee: Valeo Equipements Electriques Moteur, Creteil, France

[21] Appl. No.: 903,098

[22] Filed: Jul. 30, 1997

[30] Foreign Application Priority Data

Jul. 30, 1996 [FR] France ................................. 96 09587

[51] Int. Cl.⁶ .................................................. H02K 11/00
[52] U.S. Cl. .......................................................... 310/68 D
[58] Field of Search ....................................... 310/68 D, 64

[56] References Cited

U.S. PATENT DOCUMENTS 3,684,944   8/1972   Evgrafov et al. ..................... 310/68 D
5,296,778   3/1994   Stroud .................................. 310/68 D
5,451,823   9/1995   Deverall et al. ...................... 310/68 D
5,710,467   1/1998   Irie et al. ............................. 310/68 D

FOREIGN PATENT DOCUMENTS 388 953   9/1990   European Pat. Off. .

OTHER PUBLICATIONS

Patent Abstracts of Japan, vol. 017, No. 593 (E–1654), 28 Oct.1993 and JP 05 176505A (Nippondenso Co Ltd), 13 Jul. 1993.

French Search Report dated 9 May 1997.

Primary Examiner—Clayton LaBalle
Attorney, Agent, or Firm—Morgan & Finnegan, L.L.P.

[57] ABSTRACT

An alternator for a motor vehicle has a rectifier bridge with positive diodes which are received in holes formed in a thermally conductive sector, which is fixed to an end plate of the alternator casing and which constitutes a thermal dissipator for the rectifier bridge. The rectifier bridge further includes a second sector of thermally conductive material, which is fixed to the first sector over the holes in the latter in which the positive diodes are received.

18 Claims, 3 Drawing Sheets

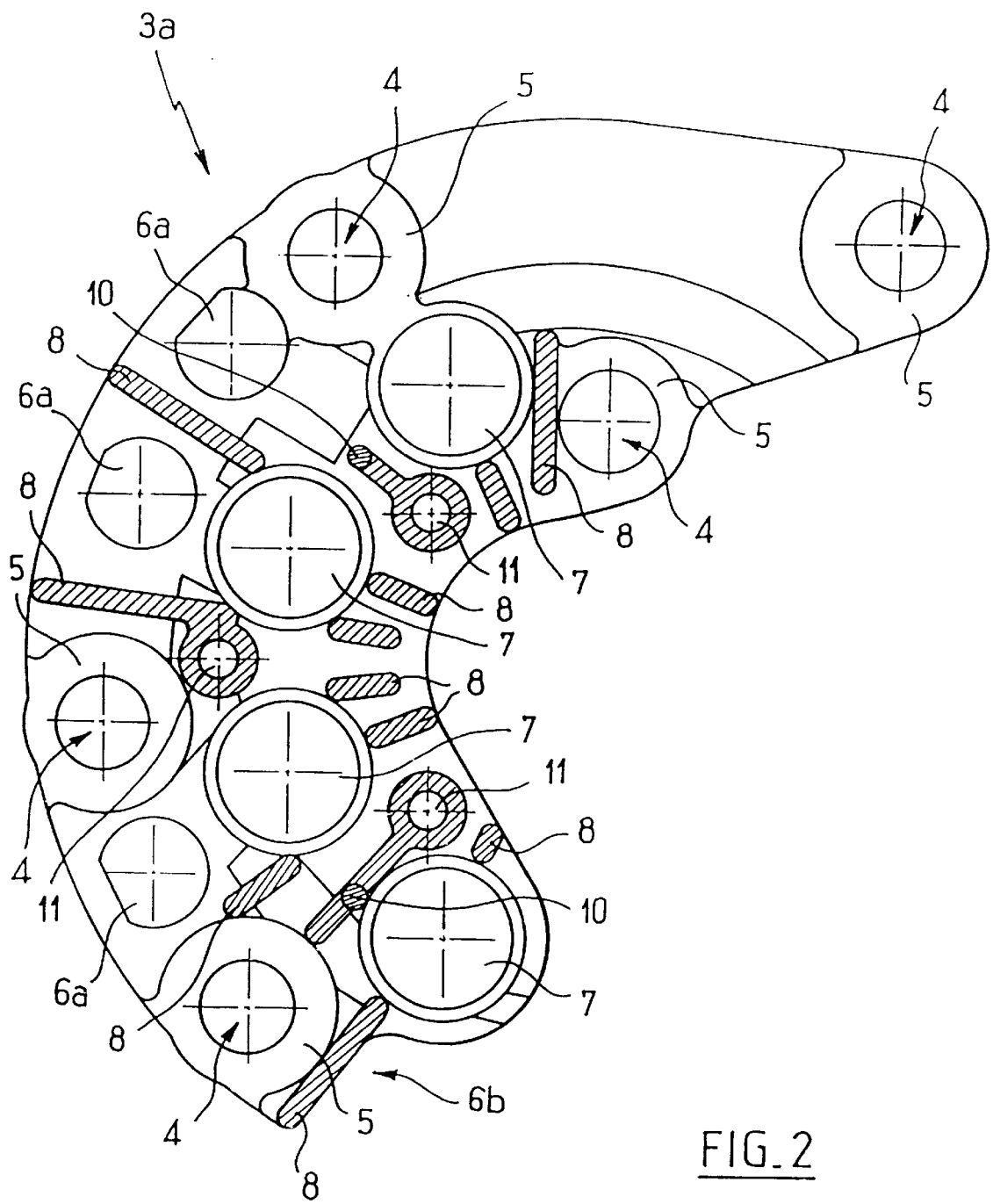
FIG_2

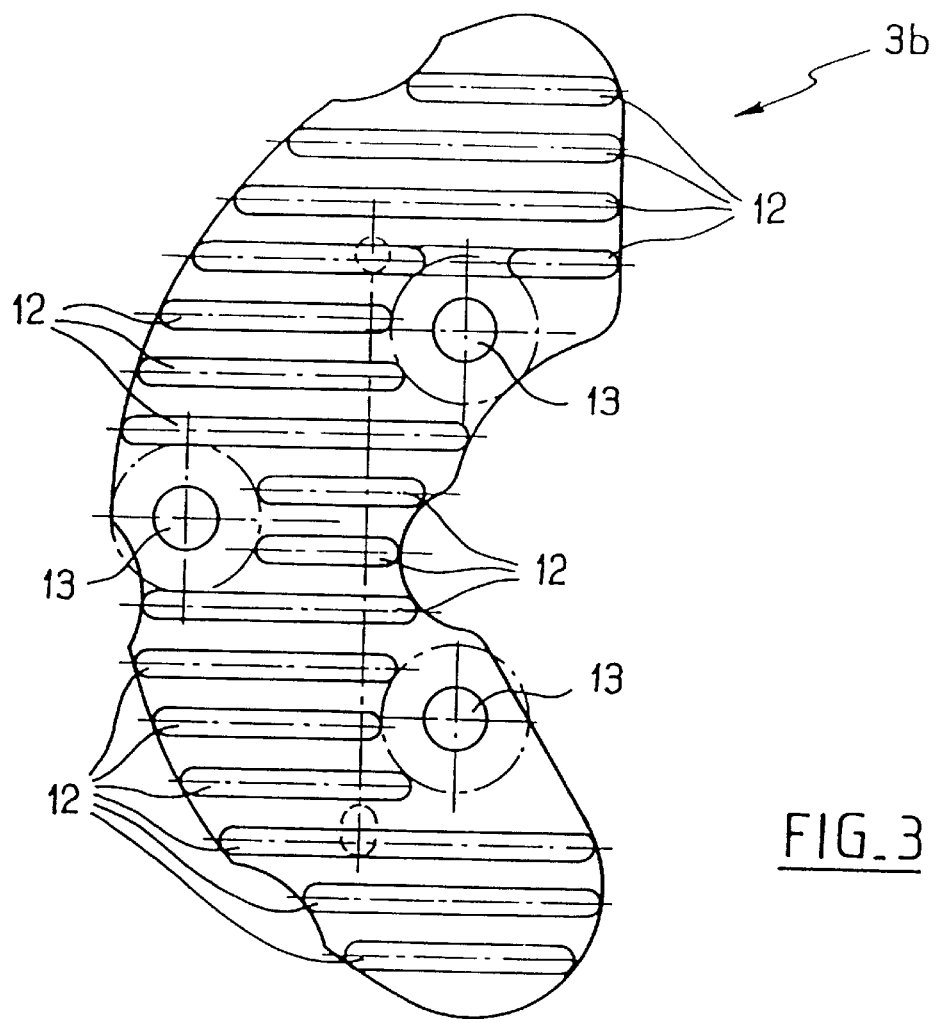
FIG_3
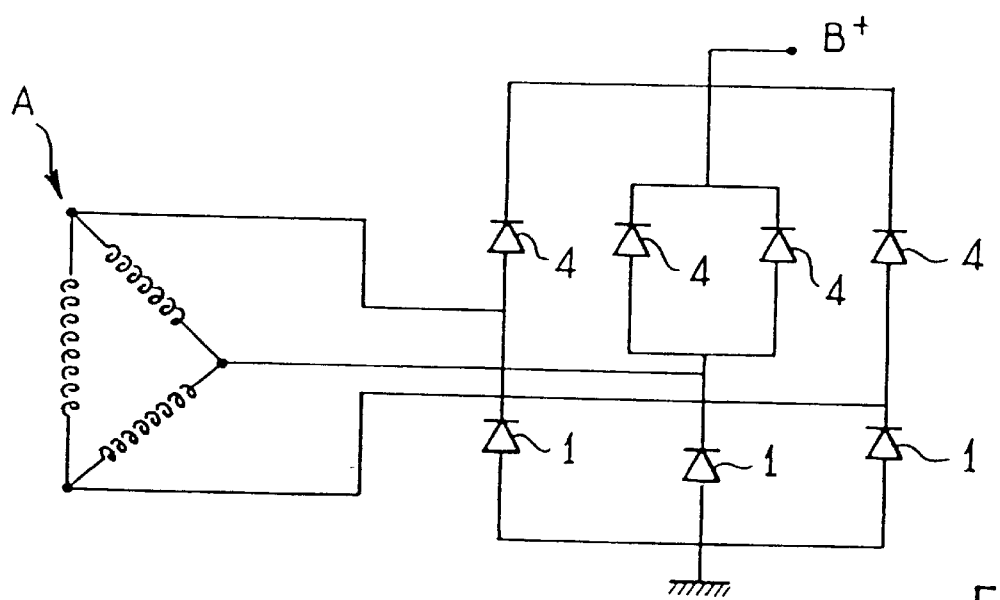
FIG_4

RECTIFIER ASSEMBLY OF A MOTOR VEHICLE ALTERNATOR WITH A THERMAL DISSIPATOR

FIELD OF THE INVENTION

The present invention relates to alternators for motor vehicles, of the kind having diode rectifier bridges and thermal dissipators associated with the rectifier bridges.

The invention is in particular applicable to the case where the positive diodes of the rectifier bridge are carried by at least one metal component of the dissipator, this component being attached to the rear end plate of the alternator casing, while the negative diodes of the bridge are mounted directly on the end plate, in line with apertures formed in the component or components of the dissipator.

BACKGROUND OF THE INVENTION

The various configurations of rectifiers of the above type are used in alternators having delta-wound stators, and also in alternators having star-wound stators with one positive diode per phase, with, optionally, one additional positive diode for rectification of the neutral point. However, these arrangements do give rise to problems regarding the dissipation of the heat produced by the diodes of the bridge.

In particular, where the alternator stator is delta-wound, overheating is found to occur, especially from the middle diodes, when the current intensity exceeds about 110 amperes.

DISCUSSION OF THE INVENTION

One object of the invention is accordingly to provide an arrangement which gives improved thermal dissipation as compared with conventional arrangements.

According to the invention, a thermal dissipator for a rectifier bridge of a motor vehicle alternator, comprising a sector in a thermally conductive material which is arranged to be carried on the alternator, and which has apertures for receiving the positive diodes of the rectifier bridge, is characterised in that it includes a second sector of a thermally conductive material, together with fastening means for fastening the second sector on the first sector, in line with apertures formed in the latter for receiving the positive diodes.

The configuration with a dissipator according to the invention is very compact, and gives, albeit within a reduced space, high heat transfer surface areas such that the air which flows around and through the rectifier bridge evacuates heat at the greatest possible rate. Such a dissipator can be used reliably with alternators in which the current may reach about 130 amperes.

It will be noted that the problem could be resolved with a single massive, or solid, two-stage component for the dissipator. However, such an arrangement would have the following drawbacks:

- because the provision of the additional dissipator is only necessary in the highest power ranges, the provision of a single component would result in a cost penalty for the lower ranges of power in which this is not necessary;
- in order to eliminate this extra cost, it would then be necessary to provide two different dissipators adapted for different power ranges; and
- finally, the surface area occupied by such a dissipator would no longer enable the diodes to be fitted easily, and could even make this impossible.

The provision of a separate dissipator eliminates the above mentioned drawbacks and, in addition, enables the dissipator to be designed in a material which is different from the main dissipator, i.e. in a material which can be less expensive and which gives better thermal dissipation performance.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 2 is a top plan view of one of the components of the dissipator mounted on the end plate of FIG. 1.

FIG. 3 is a top plan view of a second component of this dissipator.

FIG. 4 is an electrical circuit diagram of a rectifier bridge in one possible embodiment of the invention.

DESCRIPTION OF PREFERRED EMBODIMENTS OF THE INVENTION

Figure 1:
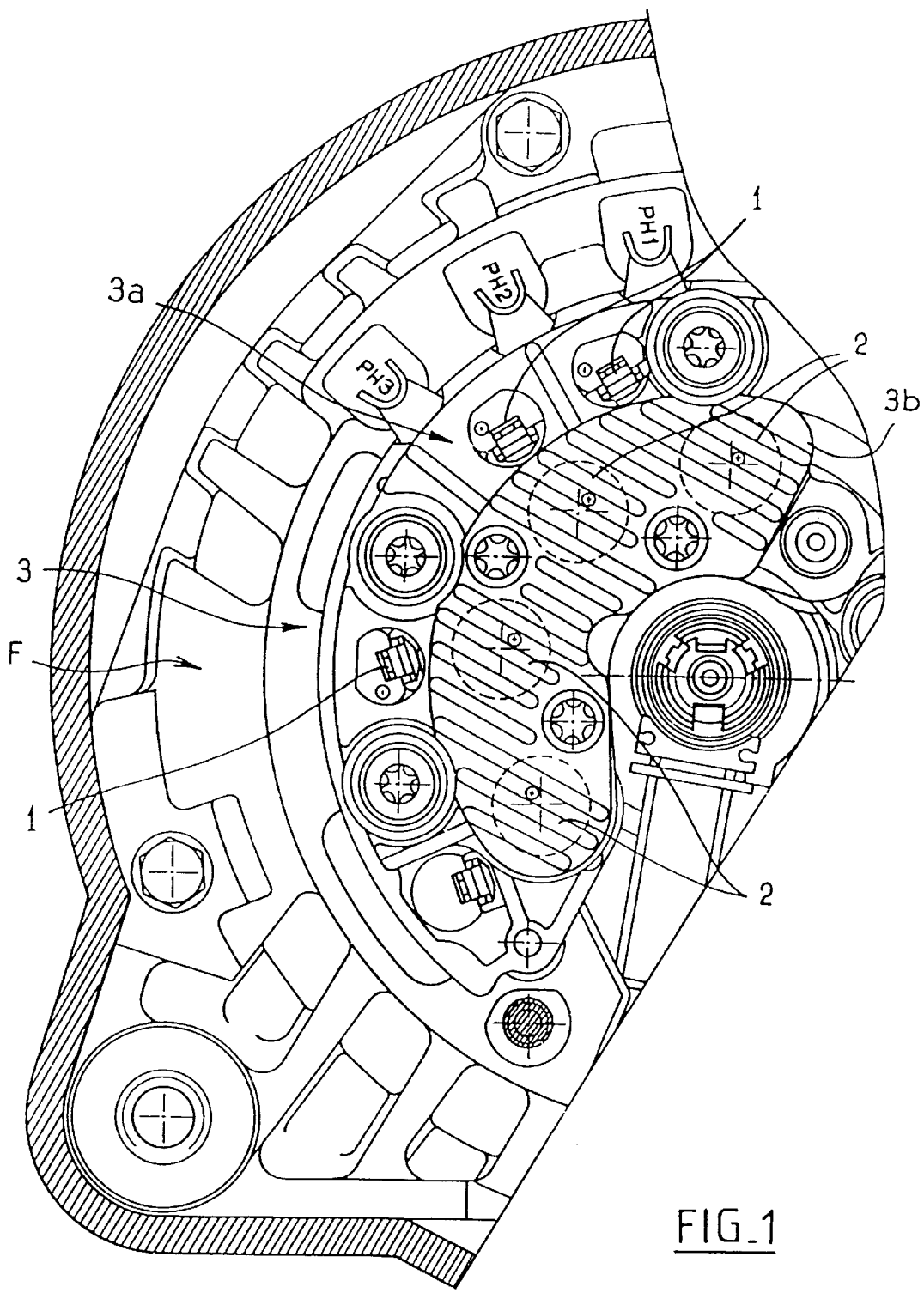
FIG. 1 is a top plan view of the rear end plate of an alternator in one preferred embodiment of the invention.

FIG. 1 shows the rear end plate F of an alternator for a motor vehicle. In the embodiment shown in FIG. 1, a rectifier bridge is mounted on the end plate F. This bridge comprises three negative diodes 1 which are mounted directly on the end plate F, together with four positive diodes 2 which are mounted on a dissipator assembly 3 which is fixed on the end plate F.

The dissipator assembly 3 consists of two metal sectors 3a and 3b which are mounted in contact with each other. The metal sector 3a is shown best in FIG. 2, and has an arcuate form which is mainly flat. The metal sector 3a is screwed on to the end plate F, and for this purpose it has a plurality of screw holes 4 which are distributed over its surface. Fastening screws extend through these holes and are received in complementary threaded holes formed in the end plate F.

The sector 3a has, on the side facing away from the end plate F (this side being the one visible in FIG. 2), rebates 5 for receiving washers on which the heads of the fastening screws bear. These washers are made of electrically insulating materials: they insulate the screw heads from the sector 3a.

In the example shown in FIGS. 1 and 2, there are five of the screw holes 4. One of these is located close to one end of the sector 3a, i.e. the right hand end seen in FIG. 2, at which the width of the sector is substantially narrower than over the remainder of the arc defined by the sector. Three further screw holes 4 are spaced apart in the immediate proximity of the arcuate outer edge of the sector, while the fifth screw hole is located in the immediate proximity of the arcuate inner edge of the sector.

In addition, the sector 3a, again close to its arcuate outer edge, has three access holes 6a which are spaced apart so that they lie in register with the three negative diodes 1 when the sector 3a is in place on the end plate F. These access holes 6a lie on an arc, which intersects a terminal recess 6b of the sector 3a, beyond the access holes 6a and at the wider end of the sector, i.e. the end seen at the bottom in FIG. 2. When the sector 3a is in place on the end plate F, this recess 6b lies in line with a zone of the end plate F in which a fourth negative diode may be mounted on the end plate. An example of an alternator having such a fourth negative diode is one having a star-wound stator with neutral point rectification, as already mentioned. Four further holes 7 are formed in the sector 3a. These holes 7 are arranged to receive the positive diodes 2 of the rectifier bridge, and are spaced apart along an arc lying between the arcuate inner edge of the sector and the holes 6a.

A set of cooling ribs or fins 8 project from the inner face of the sector 3a facing away from the end plate F, and extend substantially radially over this inner face, with reference to the circular curvature defined by the arcuate sector. The cooling fins 8 include a set of small fins disposed between the arcuate inner edge of the sector and the holes 7, in the immediate vicinity of the holes 7. Further fins 8 are arranged between the holes 7, or extend tangentially along the latter, as can be seen in FIG. 2. Still more fins 8 lie in the vicinity of the arc defining the centres of the access holes 6a.

The sector 3a has fastening means for fastening the sector 3b on the inner face, seen in FIG. 2 of the sector 3a. These fastening means comprise, in particular, locating spigots 10 which are engaged in complementary apertures formed in the sector 3b, together with three fastening holes 11 which cooperate with complementary holes formed in the sector 3b, the two sectors 3a and 3b being secured together by through fasteners passing through these holes.

In the example shown in FIG. 2, the fastening holes 11 are located in cylindrical bosses, or thickened portions, formed integrally at the ends of the three of the cooling fins 8. The locating spigots 10 are located on two of these three cooling fins.

As can be seen in FIG. 1, the sector 3b, which is in the shape of a bean, extends over a shorter arc of a circle than the sector 3a, and also has a narrower width. The sector 3b is superimposed on the sector 3a in line with the four holes 7 of the latter, so that it is in engagement on a portion of the cooling fins 8, and in particular on those of the latter that lie between the holes 8 and the inner arcuate edge of the sector 3a. When the sector 3b is in position on the sector 3a, it covers the holes 7. The profile of the arcuate inner edge of the sector 3b coincides substantially with that of the corresponding arcuate inner edge of the sector 3a.

The sector 3b is shown in greater detail in FIG. 3. On its inner side, i.e. the side shown in FIG. 3 and disposed facing away from the sector 3a, the sector 3b has a set of cooling fins 12. These fins 12 are parallel to the median radial plane of the sector, and are spaced apart at regular intervals over its surface.

The sector 3b also has three fastening holes 13, which are those referred to above which cooperate with the holes 11 of the sector 3a, together with two recesses 14 (indicated in broken lines in FIG. 3) for receiving the locating pins 10. The sector 3b is placed in position on the sector 3a, and is secured to the latter once the negative diodes 1 have been fitted on to the end plate F.

The arrangement just described provides good dissipation of heat produced by the positive diodes of the rectifier bridge.

It will be noted that it is important that both of the sectors 3a and 3b are formed as two separate components, and they are not made integrally with each other. This enables a cooling arrangement to be provided which is less expensive than a single, two-stage, component for the same purpose. It also facilitates fitting of the diodes. Moreover, the arrangement enables the dissipator to be made separately in a material different from that of the main dissipator.

It should be noted that screw fastening is preferred between the two sectors of the dissipator.

The sectors 3a and 3b may for example be cast or moulded, in aluminium or any other material having a high thermal conductivity, and the two sectors may be made of different materials from each other.

As already explained above, in the above example there are three negative diodes 1 and four positive diodes. Reference is now made to FIG. 4, showing the circuit diagram for these diodes. As can be seen in FIG. 4, two of the positive diodes 2 are connected in parallel with each other, and it will be understood that this enables overheating of the positive diodes to be avoided.

It is preferably the two middle diodes that are connected in parallel, these middle diodes being connected in a conventional circuit of the kind from which energy emission is greatest. The doubling of the middle diodes could however also be provided for the other two, or side, diodes. Moreover, it is of course possible to envisage having more than two diodes in parallel with each other.

The circuit illustrated in FIG. 4 is one possible circuit appropriate for use with a delta-wound alternator stator A.

As will have been understood from the foregoing, the dissipator described above has the advantage that it can also be used in the case of a star-wound stator, with a rectifier bridge having four positive diodes and four negative diodes for rectifying the neutral point. In that case, the fourth diode is located on the end plate F in line with the recess 6b (FIG. 2).

It will be seen that dissipators such as are described above are very flexible in application. In addition, further embodiments, other than those described above, are of course possible. In particular, the sector 3a and/or the sector 3b may be arranged without any cooling fins.

What is claimed is:

1. A thermal dissipator for use with a rectifier bridge assembly of a motor vehicle alternator, the rectifier bridge assembly having positive diodes and negative diodes, the thermal dissipator consisting of:
   a first sector, and
   a second sector,
   said first and second sectors being of thermally conductive material, the first sector configured for attachment onto said motor vehicle alternator and defining a plurality of holes for receiving positive diodes therein,
   the thermal dissipator further including at least one fastener for attaching the second sector on the first sector in line with the holes in the first sector.

2. A thermal dissipator according to claim 1, wherein the at least one fastener is a screw.

3. A thermal dissipator according to claim 1, wherein the first sector has at least four holes for receiving positive diodes.

4. A thermal dissipator according to claim 1, for an alternator in which the rectifier bridge assembly includes four negative diodes, the motor vehicle alternator defining four mounting zones in which the four negative diodes are respectively mounted, the first sector of the thermal dissipator further defining a terminal recess and three access holes, the terminal recess being located on the first sector in a position such as to give access to one of said mounting zones when the thermal dissipator is in position on the motor vehicle alternator, each of the three access holes being located in a position such as to give access to a respective one of the other three mounting zones.

5. A rectifier bridge assembly for a motor vehicle alternator, said rectifier bridge assembly comprising positive diodes mounted on a thermal dissipator according to claim 1.

6. A rectifier bridge assembly according to claim 5, wherein at least two of the positive diodes are connected in parallel with each other.

7. A rectifier bridge assembly according to claim 6, comprising at least four positive diodes substantially along an arc of a circle on the first sector of the thermal dissipator, the two diodes connected in parallel with each other being disposed in positions intermediate between those of the other two positive diodes.

8. A motor vehicle alternator comprising:

a delta-wound stator; and a rectifier bridge assembly according to claim 6.

9. A motor vehicle alternator comprising:

a star-wound stator; and a rectifier bridge assembly according to claim 5.

10. A motor vehicle alternator according to claim 9, wherein the first sector of the thermal dissipator has a terminal recess and three access holes, the rectifier bridge assembly having four negative diodes, a first negative diode being disposed in line with the terminal recess, and each of the other three negative diodes being disposed in line with a respective one of the three access holes.

11. A thermal dissipator for use with a rectifier bridge assembly of a motor vehicle alternator, the rectifier bridge assembly having positive diodes and negative diodes, the thermal dissipator comprising:

a first sector of thermally conductive material, said first sector being configured for attachment onto the motor vehicle alternator and defining a plurality of holes for receiving positive diodes therein, a second sector of thermally conductive material, said thermal dissipator having only two sectors, a fastener for attaching the second sector on the first sector in line with the holes in the first sector.

12. A thermal dissipator according to claim 11 for use with an alternator in which the rectifier bridge assembly includes four negative diodes and the motor vehicle alternator defines four mounting zones in which the four negative diodes are respectively mounted, the first sector of the thermal dissipator further defining a terminal recess and three access holes, the terminal recess being located on the first sector in a position such as to give access to one of the mounting zones when the thermal dissipator is in position on the motor vehicle alternator, each of the three access holes being located in a position such as to give access to a respective one of the other three mounting zones.

13. A rectifier bridge assembly for a motor vehicle alternator, said rectifier bridge assembly comprising positive diodes mounted on a thermal dissipator according to claim 11.

14. A rectifier bridge assembly according to claim 13, wherein at least two of the positive diodes are connected in parallel with each other.

15. A rectifier bridge assembly according to claim 14, comprising at least four positive diodes substantially along an arc of a circle on the first sector of the thermal dissipator, the two diodes connected in parallel with each other being disposed in positions intermediate between those of the other two positive diodes.

16. A motor vehicle alternator comprising:

a delta-wound stator; and a rectifier bridge assembly according to claim 14.

17. A motor vehicle alternator comprising:

a star-wound stator; and a rectifier bridge assembly according to claim 13.

18. A motor vehicle alternator according to claim 17, wherein the first sector of the thermal dissipator has a terminal recess and three access holes, the rectifier bridge assembly having four negative diodes, a first negative diode being disposed in line with the terminal recess, and each of the other three negative diodes being disposed in line with a respective one of the three access holes.

* * * * *